Aug. 31, 1954  A. CRAIGON  2,687,613
GAS TURBINE POWER PLANT
Filed April 19, 1950  5 Sheets-Sheet 1

Inventor
ADAM CRAIGON
By: Fetherstonhaugh & Co.
Att'ys

Aug. 31, 1954  A. CRAIGON  2,687,613
GAS TURBINE POWER PLANT
Filed April 19, 1950  5 Sheets-Sheet 2

Inventor
ADAM CRAIGON
By: Fetherstonhaugh & Co.
Att'ys

Aug. 31, 1954  A. CRAIGON  2,687,613
GAS TURBINE POWER PLANT
Filed April 19, 1950  5 Sheets-Sheet 3

Inventor
ADAM CRAIGON
By: Fetherstonhaugh & Co.
Att'ys

Aug. 31, 1954 — A. CRAIGON — 2,687,613
GAS TURBINE POWER PLANT
Filed April 19, 1950 — 5 Sheets-Sheet 4

Inventor
ADAM CRAIGON
By: Fetherstonhaugh & Co.
Att'ys

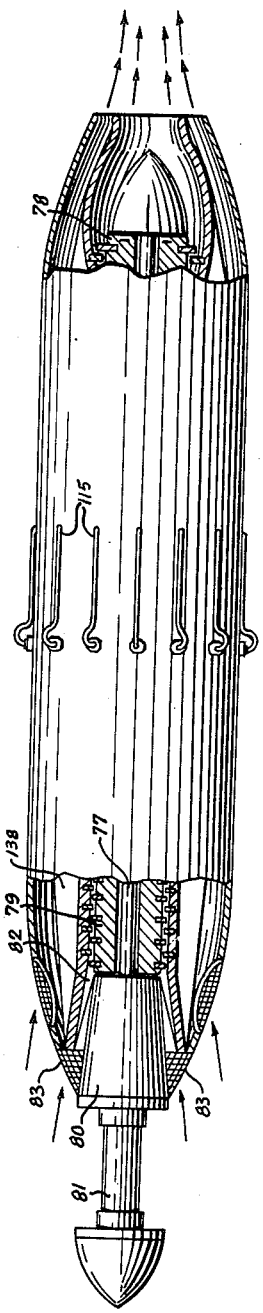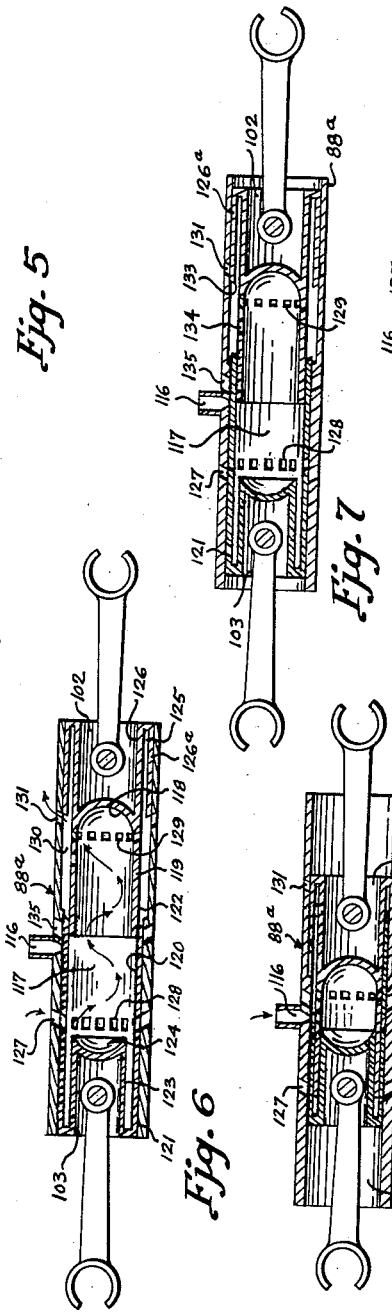

Patented Aug. 31, 1954

2,687,613

UNITED STATES PATENT OFFICE 2,687,613

GAS TURBINE POWER PLANT

Adam Craigon, Toronto, Ontario, Canada

Application April 19, 1950, Serial No. 156,895

3 Claims. (Cl. 60—39.37)

This invention relates to a gas turbine power plant.

In existing gas turbine power plants, particularly of the class employed in aircraft propulsion, a high specific fuel consumption is experienced as compared with conventional reciprocating gas or diesel engines.

Present gas turbine power plants use a centrifugal blower or compressor which is driven by a gas turbine behind it, the latter being rotated by combustion gases passing to the exhaust tail pipe. Such compressors handle a large total weight of air but discharge it at comparatively low pressure to combustion chambers which are usually arranged between the compressor and the gas turbine. Combustion in these combustion chambers is not accompanied by a pressure and temperature rise comparable with that occurring in the combustion chamber of a conventional reciprocating class of engine since combustion occurs constantly and the gases are being emitted constantly. Furthermore, combustion is initiated at relatively low pressures and, therefore, fuel consumption is high.

It is the main object of this invention to provide a combustion chamber in combination with gas compressor and turbine components, which chamber is of the expansible and contractible class so that combustion may be initiated at a predetermined pressure of the gases within the chamber whereby the efficiency and fuel consumption of conventional reciprocating class of engines may be approached.

More specifically, this invention has for its object a gas turbine power plant comprising in combination; a gas compressor, a gas turbine, a shaft co-axially mounting said compressor and turbine whereby the latter drives said compressor, a combustor having an expansible and contractible chamber, and means mounted co-axially with said shaft and driven by the latter for expanding and contracting said chamber.

Although many types of expansible chamber devices may be employed in the combination of components of this invention, such as any of the reciprocating class of engine form, being radial or free opposed piston, it is preferred that a form be employed whereby minimum frontal area is realized such as the driven opposed piston class driven by swash plates. In particular, this last form is the most desirable for the further reason that the movement of the pistons is according to simple harmonic motion and, therefore, critical speed problems are largely avoided.

A still further object of the invention is to provide a combustor having a combustion chamber which is substantially spherical and ideal at the time of combustion initiation.

With the above and other objects in view, the invention will be appreciated in more detail by reference to the following specification taken in conjunction with the accompanying drawings.

In the drawings:

Figure 5 is a view of a complete engine employing combustors according to Figure 4 with the ends of the engine cut away to illustrate an exterior cooling passage according to my invention. Note in particular that this engine is of the "turbo-prop" type as disclosed and that the whole engine is completely co-axial.

Figures 6 to 9 are detailed views of the combustors of Figure 4 illustrating the various positions of the pistons thereof in a cycle of operation.

Figure 1:
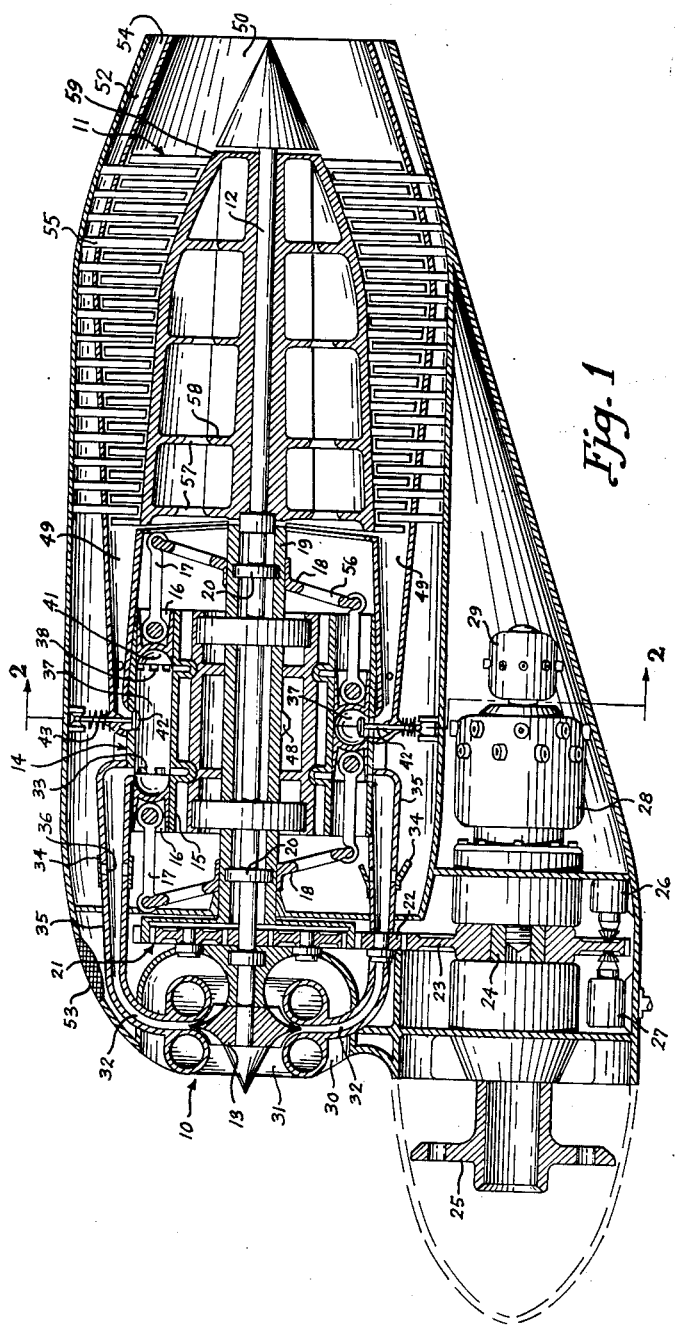
Figure 1 is a sectional view of my improved form of gas turbine power plant of a type which may be employed for the propulsion of aircraft and including a power take-off for supplementary propeller drive, being a "turbo-prop" form of engine.
Figure 2:
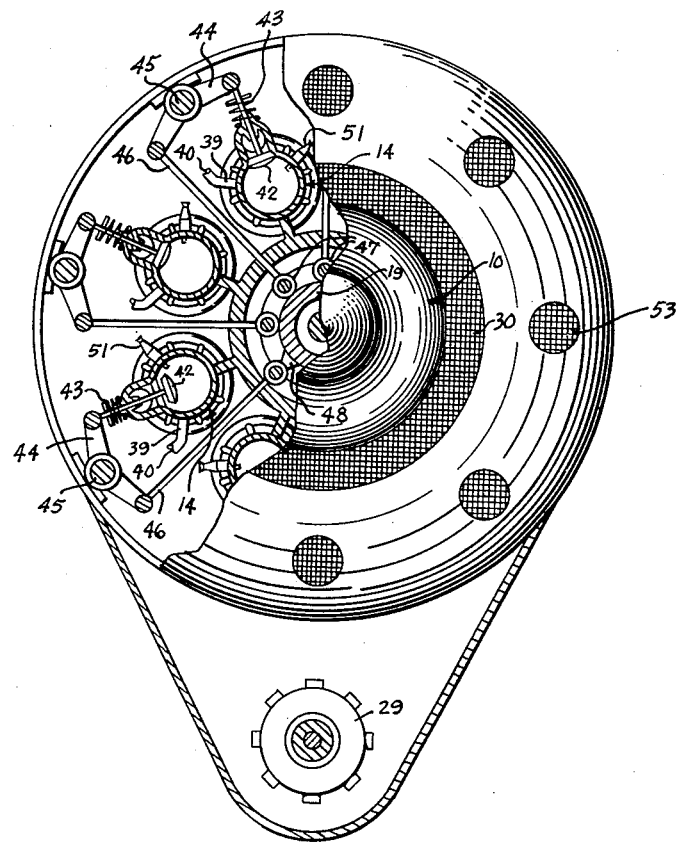
Figure 2 is a sectional view of the engine of Figure 1 on the line 2—2 thereof, illustrating in particular actuation of the exhaust valves of the combustors.

Referring to the drawings, and particularly Figures 1 and 2, a "turbo-prop" engine according to the invention comprises essentially a conventional gas compressor 10 and gas turbine 11 mounted co-axially on a common shaft 12, the latter serving to transmit driving effect from the turbine 11 to the rotor 13 of the compressor. The compressor and turbine may be of any of the well known types.

According to this invention, a combustor generally indicated by numeral 14, is employed in combination with the compressor and turbine to effect a higher compression of the gases burned in the power plant before ignition of the same. In the form of combustor shown, a plurality of such components are arranged radially about the shaft 12 at an equal distance therefrom, each of which comprises a cylinder 15 carrying a pair of opposed slidable pistons 16, the latter connecting by connecting rods 17 to swash plates 18 which are fixed to the hollow shaft 19. Suitable bearings 20 carry the hollow shaft 19 and drive connection is provided between shaft 19 and shaft 12 by means of a planetary gearing device 21 of known construction such that the shaft 12 rotates at four times the speed of the shaft 19. If desired, an idler gear 22 may transmit drive relation to gear 23 on shaft 24 for driving of the propeller flange 25 at a speed comparable to the speed of the shaft 19. Fuel transfer gear pumps 26 and 27 may be driven off the inner rim of gear 23 substantially in the manner indicated. Shaft 24 may also serve to drive a fuel injection pump 28 and an electrical high tension distributor 29.

The compressor 13 shown in Figure 1 is a double-entry radial flow blower having entry openings 30 and 31 and outlet passages 32 which connect to independent cylinders 15 at the intake openings 33 thereof substantially as shown. Suitable reed valves 34 are mounted on the intake tubes 35 embodying passages 32 and normally sealing relief ports 36 which are set to allow escape of gases from the passage 32 in excess of one pound of pressure above atmosphere therewithin.

The combustors illustrated in Figure 1 have their chambers 37 shown in expanded relation for the upper chamber and contracted relation for the lower chamber. In the case of the upper chamber, air is sucked into the chamber 37 through the intake ports 33 and at the same time the products of combustion are allowed to escape through the escape or scavenging ports 38, the piston 16 being at the extreme outward position or outer dead centre. As the pistons proceed inwardly toward one another, the intake ports 33 and escape ports 38 will be closed and the entrapped gases compressed to a predetermined pressure. As the pistons approach inner dead centre, fuel is injected through nozzles 39 (Figure 2) which connect by lines 40 to the fuel injection pump mechanism 28 which embodies a separate pump for each combustor.

The pistons 16 are preferably shaped to provide an ideally-shaped combustion chamber at the point of ignition of substantially spherical shape. Thus, each of the pistons carries a hemispherical recess 41 in the head thereof whereby a substantially spherical gap extends therebetween when the pistons are at inner dead centre position as illustrated in the lower combustor of Figure 1. The gas introduced into the combustion chamber from the compressor is compressed in the chamber to a pressure of about six hundred pounds per square inch whereby compression ignition will take place upon injection of the fuel by the nozzles 39. After sufficient time has been allowed for initiation of the combustion process, the exhaust valve 42, which may be in the form of the well known sodium-type poppet valve, is pressed inwardly against the pressure of spring 43 by the bell crank arm 44 pivoted about the pivot 45 and actuated by the valve rod 46 which rides on the hollow shaft 19 by its roller 47. Once during every revolution of the shaft 19 a boss or cam 48 thereon engages the roller 47 of the valve rod 46 causing opening of the exhaust valve.

It is important to observe that the burning gases are allowed to escape almost immediately after initiation of combustion and, therefore, as they escape and the pistons withdraw, combustion proceeds according to a constant volume process and the burning gases pass through escape manifold 49 to drive the turbine 11 and thence pass out the exhaust opening 50.

The starting of the gas turbine power plant shown in Figure 1 may be accomplished by any well known method. An electrical high tension distributor 29 which connects by suitable high tension leads (not shown) to spark plugs 51 (Figure 2) may be employed as an aid to starting.

The whole device may be cooled exteriorly by employing a cooling passage 52 which may extend completely around the pertinent mechanism, such as the compressor 10, turbine 11, and combustors 14. The cooling passage has an entry opening 53 near the front end of the device and an outlet opening 54 adjacent the exhaust opening 50. Preferably the stator blades 55 of the turbine 11 are cooled at their roots by cool air rushing through the passage 52. Also the poppet valve 42 and its actuating mechanism and exterior surfaces of the combustors are subjected to this air flow which may find its way down inwardly and about the combustors through orifices 56 in the swash plates and openings 57 in the rib structure 58 of the turbine rotor 59 to escape through small holes (not shown) leading to cooling passages extending outwardly and radially through the rotor blades of the turbine.

Figure 3:
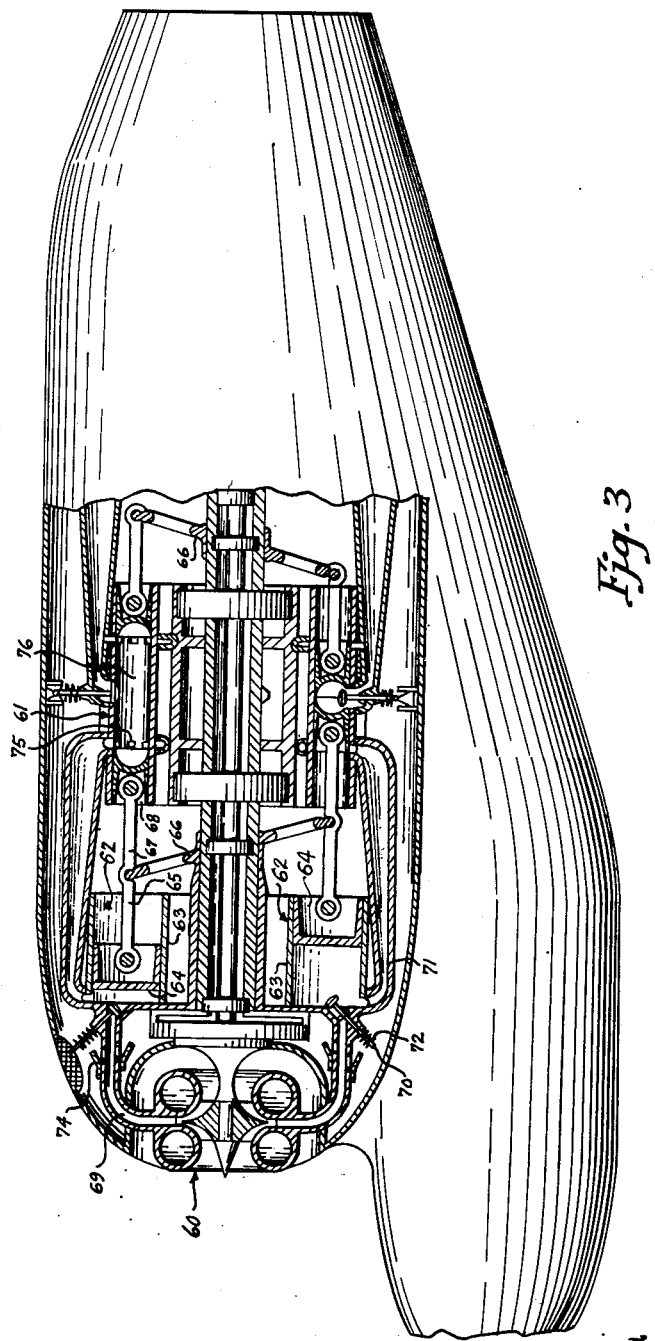
Figure 3 is a sectional view of a further modified form of engine according to the invention illustrating in particular a secondary compressor whereby gases may be compressed to a very high pressure in the combustors.

In Figure 3 a modified form of gas turbine power plant according to the invention is shown, having multi-stage compression of the incoming gases. In this case, the components are similar to those disclosed with reference to Figures 1 and 2 embodying the compressor 60 in combination with combustors 61 as before, but wherein an intermediate secondary compressor 62 is included to increase the compression of the inlet gases. Compressor 62 may embody a plurality of cylinders 63 corresponding in arrangement to the cylinders of the combustor 61 and each having a piston 64 with a connecting rod 65 commonly engaging the swash plate 66 with the connecting rod 67 of the front pistons 68 of the combustors. It may be noted here that the swash plate 66 and the swash plates 18 shown in Figure 1 are elliptical in their peripheral contour so that the path of movement of the periphery thereof is cylindrical and coaxial with the axis of the shaft connecting the compressor and the turbine.

As before, the compressor 60 delivers air through the outlet passage 69 to the combustors but, in the present case, control valves 70 determine the flow of such air into the inlet passage 71. As the piston 64 withdraws during the compression stroke of the piston 68 of the combustor 61, the valve 70 will be drawn open against the pressure of its light spring 72 to allow air to flow into the secondary compressor chamber 73. As the piston 64 advances within the cylinder 63, a pressure of approximately one pound in excess of atmosphere will force the valve to close, excess air in passage 69 thereafter escaping through the reed valves 74. On continuing advance of piston 64, air will be compressed in the chamber 73 and as the piston 68 exposes the inlet openings 75, the compressed air will rush into the expansible and contractible chamber 76. In all other respects operation is similar to that discussed with reference to Figures 1 and 2.

In Figures 4 to 9 an axial flow style of gas turbine power plant according to the invention is shown in detail. The device previously discussed may be made in the same style if desired, the present form illustrating in particular modification of the combustors whereby a poppet valve controlling the exhaust of gases from the combustors is eliminated by employing sleeve-like valve components in conjunction with the pistons. Thus, in Figure 5, the axial flow style of engine comprises a through shaft 77 having at one end a suitable turbine 78 which provides driving effect through the shaft 77 for the multistage axial flow type compressor 79. A gear reduction device 80 of the planetary type transmits the driving effect to the propeller mounting spindle 81. Air passes into the intake passage 82 from the front screened opening 83 and is compressed by the axial flow compressor in well known manner.

Figure 4:
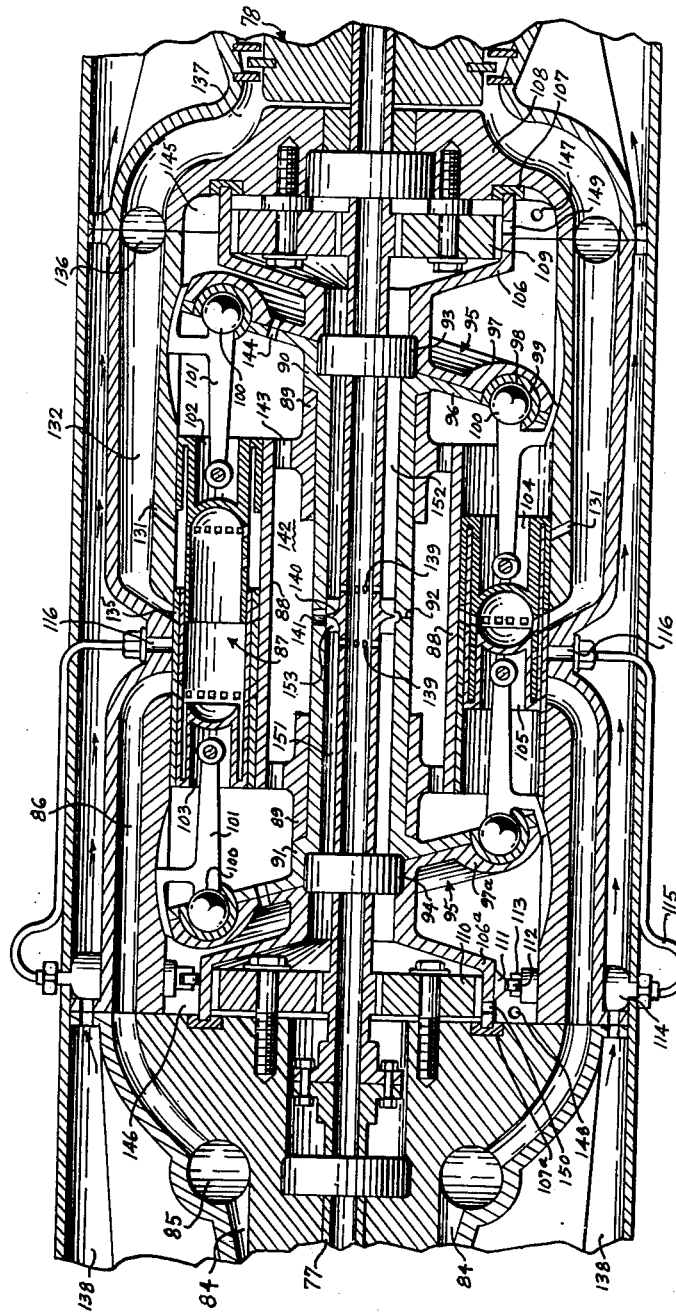
Figure 4 is a partial sectional view of a modified form of engine according to the invention showing in detail a preferred form of combustor arrangement according to my design.

Referring to Figure 4, a Venturi passage 84 leading to an annular opening 85 forms the terminus of the compressor according to known teachings. A plurality of intake passages 86 extend to a plurality of combustors 87 arranged in a manner similar to the combustors previously discussed herein but which are of modified design.

Each of the combustors comprises a stationary cylinder 88 having inwardly disposed annular seating rings 89 which support and limit axial movement of the hollow swash plate shafts 90 and 91 which are inter-connected at their meeting faces 92 by suitable means (not shown) to prevent relative movement of one with respect to the other. Shafts 90 and 91 are mounted on suitable bearings 93 and 94 carried by through shaft 77. The swash plates 95 are similar and are built up of inner and outer plates 96 and 97 which may be bolted or otherwise suitably fastened together and which together form an annular recess 98 which in section comprises more than a semi-circle of bearing surface and which has seated therein a bearing liner 99 designed to receive the ball end 100 of the connecting rods 101 which connect to pistons 102, 103, 104 and 105 in the manner shown. The outer plates 97 and 97a carry an aligning flange 106 and 106a which slidably seat in the bearing rings 107 and 107a set in the ends of the main body portion 108 which, in part, comprises the cylinders 88. Suitable planetary gearing arrangements 109 and 110 are provided at each end for drive connection between the shaft 77 and the flanges 106 and 106a of the outer plates 97 and 97a.

The flange 106a carries a cam-like boss 111 on the outer surface thereof against which ride the rollers 112 of the actuating members 113 of fuel injector cylinders 114 which connect by injecting lines 115 to injecting openings 116 in the cylinder 88.

In order to discuss the specific structure of these modified combustors in detail it is necessary to refer to Figures 6 to 9 showing pistons 102 and 103 at various relative positions during a cycle of operation.

In Figures 6 to 9 the cylinder 88 is shown in simple form and designated as 88a. The piston 103 is shown in solid lines rather than in section for clarity although it will be understood that it is intended to represent such pistons in section.

In Figure 6 the air intake into and scavenging of the expansible and contractible combustor chamber 117 is illustrated. It will be observed that the piston 102 comprises a head construction having a hemispherical pocket 118 from the edges of which projects the longitudinally extending sleeve 119 which slidably rides within the inner surface 120 with the longitudinally extending sleeve 121 of the piston 103. The inner surface 122 of sleeve 119 slidably rides over the outer surface 123 of the piston 103, the latter having a similar hemispherical pocket 124 formed in its head. The longitudinally extending sleeve 121 also slidably rides within the cylinder 88a and when the pistons are moved toward inner dead centre the end of the sleeve 121 will slidably fit within the annular recess 125 of piston 102 which is defined by the inner sleeve 126 forming a rearward projection of the sleeve 119 and an outer sleeve 126a slidably riding within the cylinder 88a.

In operation, and referring to Figure 6 in detail, air under compression from the axial flow compressor 79 of Figure 5 passes through the intake passage 86 of Figure 4 to pass through the intake passages 127 of the cylinder 88a and through the multiple intake openings 128 in the sleeve 121 of piston 103 when the latter are in alignment with the intake passages 127. It is specifically desired that the intake openings 128 be formed to cause a tangential swirling of the air as it rushes into the chamber 117. As air rushes into the chamber 117, spent gases from the previous cycle are washed out of the chamber through the scavenging ports 129 to the annular clearance chamber 130 to escape through the scavenging opening 131 to the outlet passage 132 (Figure 4).

As the pistons move toward one another as indicated in Figure 7, the terminal end 133 of the outer sleeve 126a of piston 102 passes over the scavenging opening 131 and the sleeve 121 of piston 103 closes over the intake passages 127. Air is thus trapped in the chamber 117 as the pistons proceed toward inner dead centre on the compression stroke.

As the pistons approach inner dead centre the injection opening 116 of the cylinder 88a finds registry with the intake ports 128 of piston 103 and the injection port 134 of piston 102. At this point of operation, the fuel injecting cylinder 114 has its injector actuator moved inwardly by engagement of the roller 112 thereof with the cam-like boss 111 on the flange 106a of the outer swash plate component 97a. Injection is momentary in accordance with known practice and combustion is initiated according to diesel principles. However, as the pistons reach inner dead centre, the burning gases are allowed to escape as will be observed in referring to Figure 9.

In Figure 9 the ports 128 of piston 103 and ports 129 of piston 102 arrive in registry with one another and with the escape openings 135 leading directly to the outlet passage 132.

Referring again to Figure 4, it will be observed that the various outlet passages 132 lead to an annular chamber 136 inter-relating all of such passages whence they extend to a restriction 137 of conventional form providing entry into the gas turbine 78.

The swash plates described serve to control the pistons in both inward and outward movement under driven effect transmitted through the planetary gear reduction devices described operatively related to the high speed through shaft 77 driven by the turbine 78.

As before, an outer cooling passage 138 extends over the whole length of the power plant described providing circulation as indicated by the arrows on Figures 4 and 5.

In the central regions of the whole unit lubrication and a certain degree of cooling is effected by oil circulation. A suitable external oil cooler of conventional construction may be employed, the output of which enters the hollow through shaft 77 near the rear and front ends thereof.

The oil escapes through the ports 139 on either side of a small impeller structure 140 (Figure 4) which comprises the impeller portion of a double entry radial flow type pump having at least one outlet 141. Oil passes into the annular space 142 and proceeds out suitable holes 143 to the region of the swash plates 95 through suitable holes 144 in the latter to the end spaces 145 and 146. Suitable outlet openings 147 and 148 in the latter spaces lead to return lines extending back to the cooler. Suitable holes 149 and 150 are provided in the flanges 106 and 106a of the swash plates whereby some of the oil may flow inwardly through the planetary gear devices and back through the bearings 93 and 94 to the annular chambers 151 and 152 leading to the entry openings of the double entry pump 153.

It will be appreciated that the present invention in essence involves the provision of combustors of a form which compress the gases to be burned before combustion of the latter and in combination with conventional or other suitable designs of gas compressor and gas turbine components wherein the complete mechanism is arranged about a common axis. It is thus intended that the present disclosure should not be construed in any limiting sense apart from that indicated by the scope of the following claims.

What I claim as my invention is:

1. A gas turbine power plant comprising in combination: a gas compressor, a gas turbine, a shaft co-axially mounting said compressor and turbine whereby the latter drives said compressor, a combustor having an expansible and contractible chamber, means mounted co-axially with said shaft and driven by the latter for expanding and contracting said chamber, and a reciprocating class of gas compressor designed to receive gas from said first compressor and to deliver it to said combustor at high pressure.

2. A gas turbine power plant as claimed in claim 1, in which the means for expanding and contracting said chamber serves also in the actuation of said reciprocating class compressor.

3. A gas turbine power plant comprising in combination: a gas compressor, a gas turbine, a shaft co-axially mounting said compressor and turbine whereby the latter drives said compressor, a combustor, a piston and cylinder forming a part of said combustor and providing an expansible and contractible chamber of a volume determined according to the movement of the piston, means connecting said turbine to said piston to provide driving of said piston by said turbine, means for introducing gases to said chamber as the volume of said chamber approaches a maximum, means for sealing said chamber as the volume of the chamber is contracted to a minimum to cause pressures therewithin to rise to a predetermined value adapted for ignition, means for releasing burning gases from said chamber to said turbine substantially as said chamber begins to expand whereby a minimum of the energy of said burning gases may be transmitted to the piston driven by said turbine, a reciprocating class of gas compressor, means for communicating gases compressed by said reciprocating compressor to said chamber when the latter is expanding, means communicating the gases compressed by said first mentioned gas compressor to said reciprocating compressor; and means for driving said reciprocating gas compressor by said turbine.

References Cited in the file of this patent

UNITED STATES PATENTS

| Number | Name | Date |
|---|---|---|
| 819,089 | Shoemaker | May 1, 1906 |
| 1,987,699 | Moore | Jan. 15, 1935 |
| 2,399,046 | Larrecq | Apr. 23, 1946 |
| 2,425,177 | Cronstedt | Aug. 5, 1947 |
| 2,493,873 | Hill | Jan. 10, 1950 |
| 2,595,396 | Lee | May 6, 1952 |

FOREIGN PATENTS

| Number | Country | Date |
|---|---|---|
| 142,959 | Great Britain | May 20, 1920 |
| 515,457 | Great Britain | Dec. 5, 1939 |